(12) United States Patent
Marxer

(10) Patent No.: US 6,815,865 B2
(45) Date of Patent: Nov. 9, 2004

(54) SWITCHING ARRANGEMENT FOR A RADIATION GUIDE

(75) Inventor: Cornel Marxer, Neuchatel (CH)

(73) Assignee: Seralco Microtechnology Ltd., Schaan (LI)

( * ) Notice: Subject to any disclaimer, the term of this patent is extended or adjusted under 35 U.S.C. 154(b) by 135 days.

(21) Appl. No.: 10/182,670

(22) PCT Filed: Jan. 31, 2001

(86) PCT No.: PCT/CH01/00072

§ 371 (c)(1),
(2), (4) Date: Sep. 30, 2002

(87) PCT Pub. No.: WO01/57578

PCT Pub. Date: Aug. 9, 2001

(65) Prior Publication Data

US 2003/0117038 A1 Jun. 26, 2003

(30) Foreign Application Priority Data

Jan. 31, 2000 (EP) .............................. 00810088
May 30, 2000 (EP) .............................. 00810475

(51) Int. Cl.⁷ ............................................. G02B 6/26
(52) U.S. Cl. .......................... 310/309; 385/17; 385/18
(58) Field of Search ....................... 310/309; 385/14–18

(56) References Cited

U.S. PATENT DOCUMENTS

| | | | | |
|---|---|---|---|---|
| 4,988,157 A | * | 1/1991 | Jackel et al. ................... | 385/17 |
| 5,699,462 A | * | 12/1997 | Fouquet et al. ............... | 385/18 |
| 5,780,948 A | | 7/1998 | Lee et al. | |
| 5,960,131 A | * | 9/1999 | Fouquet et al. ............... | 385/17 |
| 5,998,906 A | | 12/1999 | Jerman et al. | |
| 6,072,924 A | * | 6/2000 | Sato et al. ..................... | 385/18 |
| 6,195,478 B1 | * | 2/2001 | Fouquet ........................ | 385/17 |
| 6,396,974 B1 | * | 5/2002 | Makihara et al. ............. | 385/17 |
| 6,487,333 B2 | * | 11/2002 | Fouquet et al. ............... | 385/18 |
| 6,532,319 B2 | * | 3/2003 | Myer et al. ................... | 385/17 |

FOREIGN PATENT DOCUMENTS

| | | |
|---|---|---|
| EP | 0 411 607 A2 | 2/1991 |
| JP | 8-201857 | 8/1996 |
| WO | 98/12589 A1 | 3/1998 |

OTHER PUBLICATIONS

Marxer et al., Journal of Microelectromechanical Systems, Bol. 6, No. 3, pp. 277–284 (1997).
Juan et al., Journal of Microelectromechanical Systems, vol. 7, No. 2, pp. 207–212 (1998).
"Optical Fiber Splices and Connectors Theory and Methods", Calvin M. Miller, et al., 1996 AT & T Bell Laboratories, pp. 138–145.
"Principles of Optics", Max Born, et al., Fifth Edition 1975, pp. 628–635.

* cited by examiner

*Primary Examiner*—Mark Budd
(74) *Attorney, Agent, or Firm*—Birch, Stewart, Kolasch & Birch, LLP

(57) ABSTRACT

The radiation guide switching arrangement having at least one radiation guide switch is produced from a sandwich wafer. The sandwich wafer has a substrate, a covering layer and an electrically insulating intermediate layer. Each radiation guide switch has a moveable switching part (7) as well as at least two radiation guide ends (6), which come to rest in a plane and are arranged closely adjacent to one another such that radiation which emerges from one radiation guide end (6) can be blocked on its optical path to another guide end (6), or can be reflected into this other guide end, by means of the switching part (7). The intermediate space (5) which accommodates the switching part (7) between the guide ends (6) is filled with an index matching liquid (87) which has a predetermined refractive index, and the radiation-carrying core (8) of each radiation guide (49) is designed to taper such that radiation collimation (14) can be achieved by interaction with the refractive index of the index matching liquid (87) and the free core profile (13) in the space which is filled with liquid.

11 Claims, 9 Drawing Sheets

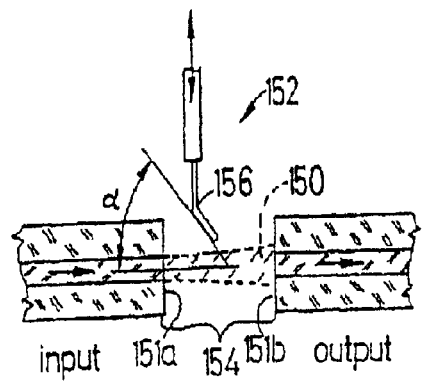 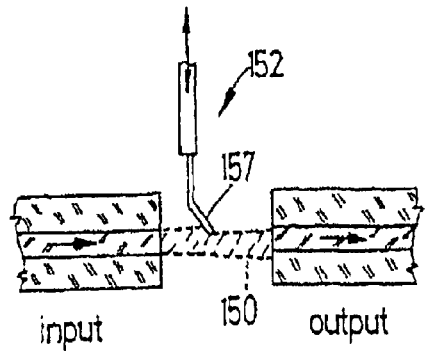
Fig. 12  Fig. 13
Fig. 14
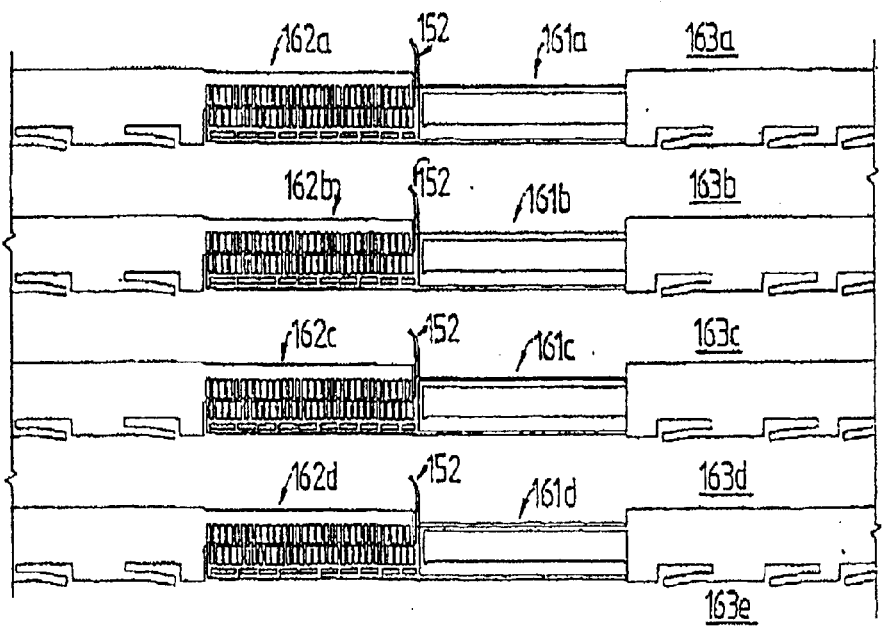

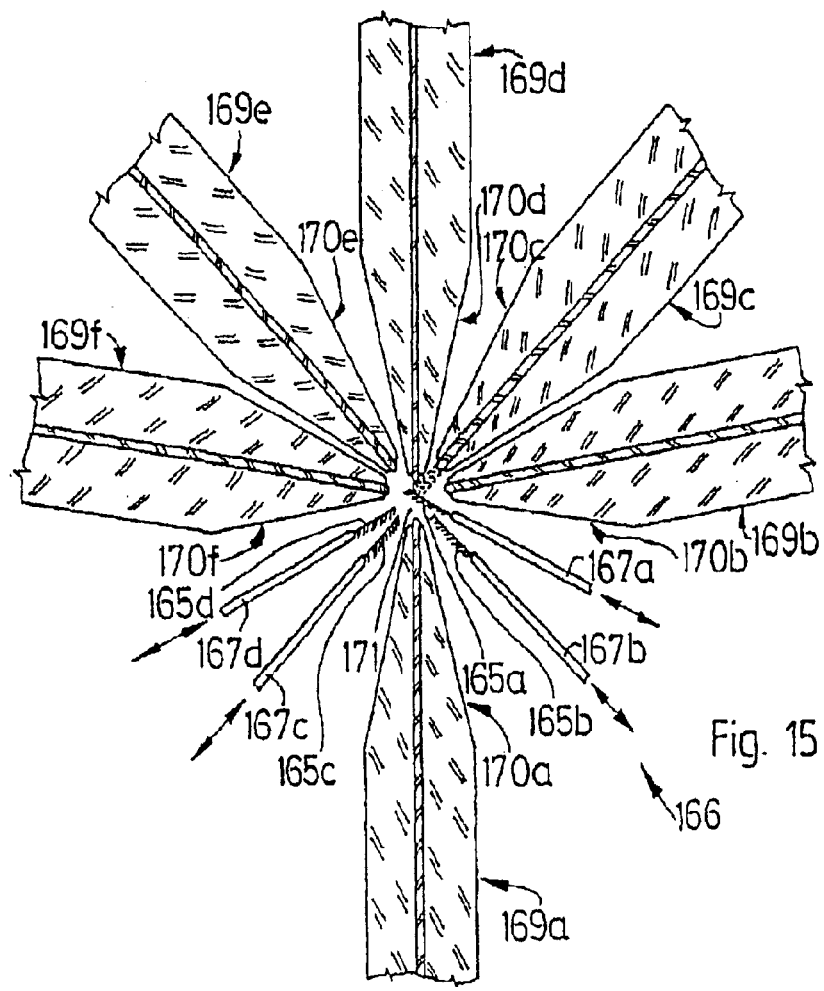
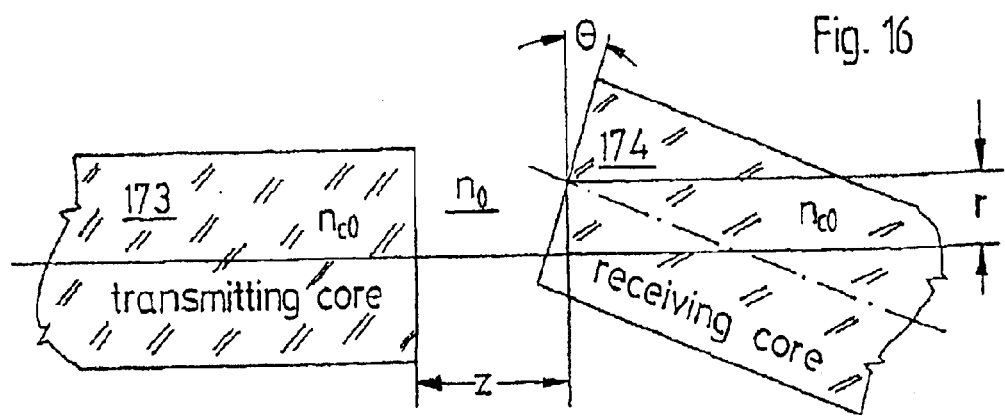

SWITCHING ARRANGEMENT FOR A RADIATION GUIDE

This application is the national phase under 35 U.S.C. §371 of PCT International Application No. PCT/CH01/00072 which has an International filing date of Jan. 31, 2001, which designated the United States of America.

1. Technical Field

The invention relates to a radiation guide switch arrangement as claimed in the precharacterizing clause of patent claim 1, and to a method for producing it as claimed in the precharacterizing clause of patent claim 10.

2. Prior Art

A radiation guide arrangement is known from WO 98/12589. The known arrangement has four optical fiber insert channels, which run toward one another in the form of a star, with optical fibers inserted in them. A moveable switching part was arranged at the intersection point of the projection of the fiber ends. The switching part could be withdrawn from the intersection point, as a result of which it was then possible for light to be transmitted between any two opposite optical fiber ends. This light transmission was inhibited when the switching part was inserted. Since the switching part was mirrored, light transmission then occurred via the mirror surface between two adjacent fiber ends arranged at 90° to one another.

The switching part was arranged in a holder which was in the form of filigree and had two pairs of leaf springs arranged one behind the other on the left and right. The longitudinal faces of each leaf spring had a first comb structure, which engaged in a second comb structure that was arranged in a fixed position on a base plate. The comb structures could be attracted to one another or repelled from one another by applying an electrical voltage, by which means the switching part was drawn in or drawn out at the intersection point. A mechanical stop was provided on the leaf springs for each defined position of the switching part.

DESCRIPTION OF THE INVENTION

OBJECT OF THE INVENTION

The object of the invention is to provide a radiation guide switching arrangement which has low radiation losses, or exactly adjustable radiation losses, with a good switching response.

ACHIEVEMENT OF THE OBJECT

The object is achieved by producing a radiation guide arrangement having at least one radiation guide switch from a sandwich wafer with a substrate, a covering layer, and an electrically insulating intermediate layer. Each radiation guide switch has at least one moveable switching part as well as at least two radiation guide ends which come to rest in a plane. The radiation guide ends are arranged closely adjacent to one another such that radiation which emerges from one radiation guide end can be blocked on its optical path to another guide end, or can be reflected into this other guide end, by means of the switching part. The intermediate space which holds the switching part is, according to the invention, filled with an index matching liquid having a predetermined refractive index. Furthermore, the core of each radiation guide, which carries the radiation, is designed to taper such that radiation collimation can be achieved by interaction with the refractive index of the index matching liquid and the free core profile in the space which is filled with liquid.

It is thus not sufficient to arrange the radiation guide ends as close to one another as possible. The end region of each radiation guide and the refractive index of an index matching liquid between the radiation guide ends should be matched to one another so as to ensure good radiation transmission between the radiation guide ends. In order to achieve good radiation transmission, the guide ends are designed, and the corresponding index matching liquid is chosen, such that the radiation which emerges from one guide end is passed to the other guide end with only low losses. Radiation guidance with losses that are as low as possible can be achieved in the free space (which is filled with index matching liquid) between the ends if the beam which emerges from the guide end can be passed to the other guide end with the same beam diameter. This means that a collimated beam must emerge from the guide end. Radiation collimation is achieved by designing the guide core which carries the radiation such that it tapers in its end region, and by searching for the index matching liquid such that its refractive index for the radiation which is to be transmitted in the radiation guide results, together with the core profile, in the desired lens effect for radiation collimation.

The refractive index of the index matching liquid should at most be of equal magnitude to refractive index of each radiation guide core. The refractive index of the liquid is preferably chosen to be between 99.90% and 98.00% with respect to the core refractive index. Very good results can be achieved with a refractive index between 99.4% and 98.6%. If the distance between the guide ends is short (in the region of 30μm), a good value of the refractive index is obtained in the region of 99.1% (at 25° C.). This value allows stable coupling at a temperature range between −10° C. and 85° C. at a wavelength of between 1250 nm and 1630 nm. This value should increase if the distance is greater.

The radiation guide switching arrangement according to the invention also makes use of radiation guide switches with a mirrored switching part. If a switching part such as this is used, then, on the one hand, it is possible to "pass on radiation" between mutually opposite radiation guide ends when the switching part is withdrawn from the intermediate space, as already indicated above. When the switching part is inserted into the intermediate space, the passing on of radiation is interrupted; however, radiation which emerges from a radiation guide can now be reflected (passed on) into another radiation guide. If passed on "straight", the collimated beam emerges from the one guide and enters the opposite guide. If not, the collimated beam is deflected by the mirror. In order that this switching operation can operate with minimal radiation losses, the radiation guide ends as well as the mirrored surface must be positioned exactly. To do this, all the radiation guide ends to be switched are located in a plane. The mirror surfaces of the switching part must then be positioned at right angles on this plane. It has now been shown that a mirrored switching part which was produced according to the method described in WO98/12589 had mirror surfaces which are not at right angles, which then led to additional radiation losses between two guide ends.

It has now been found that those surfaces of the switching part from WO98/12589 which are not at right angles were a result of the etching process described there. In contrast to WO98/12589, a sacrificial web is now in each case produced at a short distance in front of the mirror surfaces which are to be produced by etching. This greatly reduces any space holding etching ions in front of the mirror surfaces to be produced, thus making it possible to prevent, or greatly minimize, oblique etching. Mirror surfaces produced in this way are now at right angles.

The expression a good switching response does not just mean that the radiation is transmitted with losses that are as low as possible when the switch is in the "switched-on position". The switching times must also be reproducible, and it must be possible to carry out the switching operations quickly. However, this also refers to switching processes by means of which a predetermined attenuation can be set. However, the switching times in the case of the radiation guide switch known from WO98/12589 differed; furthermore, high voltages had to be applied to the comb structure of each holder having a switching part, in order that it was possible to overcome the "tearing free effect" from one switching position to the other.

It has been possible to eliminate this "tearing free effect" in the embodiment described below since two identical comb structure engaging in one another have no longer been used, and, instead the tine end region of one of the two comb structures has a region with a broadened cross section. This thus results in a second fixed-position comb structure which matches the first comb structure. The comb tines of the second comb structure are arranged with a gap with respect to the first comb structure. A first and a second electrical voltage can be applied to the two comb structures in order to produce an electrostatic movement. It is now possible to configure the region with a broadened cross section, that is to say to design it with an electrostatic voltage application, such that the switching part can be held in a stable position.

At least one leaf spring element is firmly connected to the holder. The leaf spring elements are designed such that they run approximately at right angles to the movement direction of the holder.

In addition, it has been shown that this configuration, which will be described in more detail in the following text, made it possible for the index matching liquid to be displaced out of the intermediate spaces between the tines easily. This resulted in a faster switching response than the switch in WO98/12589.

The electrostatic force between adjacent tines in the first and second comb structures depends on the width of the gap between these tines. With a conical, arrow-shaped tine configuration, the gap width varies to a greater extent with the mutual separation between the two structures than in the case of tines of the same thickness, as in WO98/12589. For this reason, there was no need for the movement stops as in WO928/12589; surprisingly, there is now no longer any tearing free effect.

The switching part may also be designed without being mirrored. It can then be inserted into a radiation-carrying space in the intermediate space between two respective guide ends so as to achieve a predetermined radiation attenuation. The attenuating part of the switching part, which can be inserted into the radiation-carrying space, is preferably provided with a metal coating. Furthermore and in particular, the attenuating region of the switching part is no longer arranged at right angles to the aligned axis of the two guide ends, but at an angle $\alpha$ of less than 65° and preferably of less than 50°. This makes it possible to reduce polarization-dependent attenuation resulting from the inserted attenuating part.

Instead of having to operate with just one switching part as stated above, a number of switching parts may be used in a single radiation guide switch. Each switching part can then be moved in front of in each case two radiation guide ends of two radiation guides such that radiation coupling and attenuation respectively is possible. The switching parts are preferably associated with the radiation guide ends such that output radiation from a number of radiation guide ends can in each case be coupled individually into a single radiation guide end, depending on the switching position of one of the switching parts. Furthermore, the arrangement may optionally be designed such that the output radiation from a single radiation guide end can in each case be coupled individually into one of the other radiation guide ends, depending on the switching position of one of the switching parts.

A fluid-tight housing with fluid-tight bushings for the radiation guides and the electrical cables is preferably provided. The interior of the housing is then filled with the index matching liquid, except for a gas bubble. The volume of the gas bubble is predetermined such that any pressure in the interior of the housing resulting from thermal effects is not greater than or less than a predetermined value.

Instead of producing a single radiation guide switching arrangement, a number of switches can be produced which are arranged like a matrix in one plane, preferably on a first chip. In particular, this chip has integrated electrical guide subelements for electrical voltages which can be applied to the switches. A second chip, which is in the form of a waveconductor chip and is preferably applied using flip chip technology, is then provided for the optical and, preferably, the electrical connections between the switches.

The radiation guide switching arrangement having at least one radiation guide switch, which has one switching part, is produced from a sandwich wafer. The sandwich wafer has a substrate, a covering layer and an electrically insulating intermediate layer. As has already been stated above, the switching part can be moved in front of at least two radiation guide ends which lie in a plane. The radiation guide switching arrangement, inter alia with the switching part and the guide channels for the radiation guides and their ends, is produced by means of an etching process from the sandwich wafer. The etching process is used to produce at least one sacrificial web in the immediate vicinity of each of the outer faces of the switching part, which run at right angles to the plane, in order to avoid the outer faces having a profile which differs from the normal to the plane.

The sandwich wafer has a covering layer which is composed essentially of silicon and whose unmasked areas are removed in an ion etching process. Each sacrificial web is at a distance of approximately 10 $\mu$m, with a distance tolerance of −5 $\mu$m to +20 $\mu$m, for a covering layer thickness of approximately 73 $\mu$m with a thickness tolerance of ±3 $\mu$m.

BRIEF DESCRIPTION OF DRAWINGS

Examples of the radiation guide switching arrangement according to the invention and of its production will be explained in more detail in the following text, with reference to the figures. Further advantages of the invention will become evidence from the following description text. In the figures:

FIG. 12 shows a schematic illustration of a radiation guide switch which can be used as an attenuating unit, in a switching position with basic attenuation, FIG. 13 shows the attenuating unit, as illustrated in FIG. 12, with a predetermined attenuation produced by an attenuating part which has been inserted by a predetermined amount, FIG. 14 shows an array-like arrangement of attenuating units as illustrated in FIGS. 12 and 13, and FIG. 15 shows a variant of the radiation guide switches, as shown in FIGS. 1 and 9, having a number of switching parts.

FIG. 16 is an illustration to assist in an explanation of how to estimate coupling losses between radiation guides depending on the relative end orientation of the guides.

APPROACHES TO IMPLEMENTATION OF THE INVENTION

Figure 1:
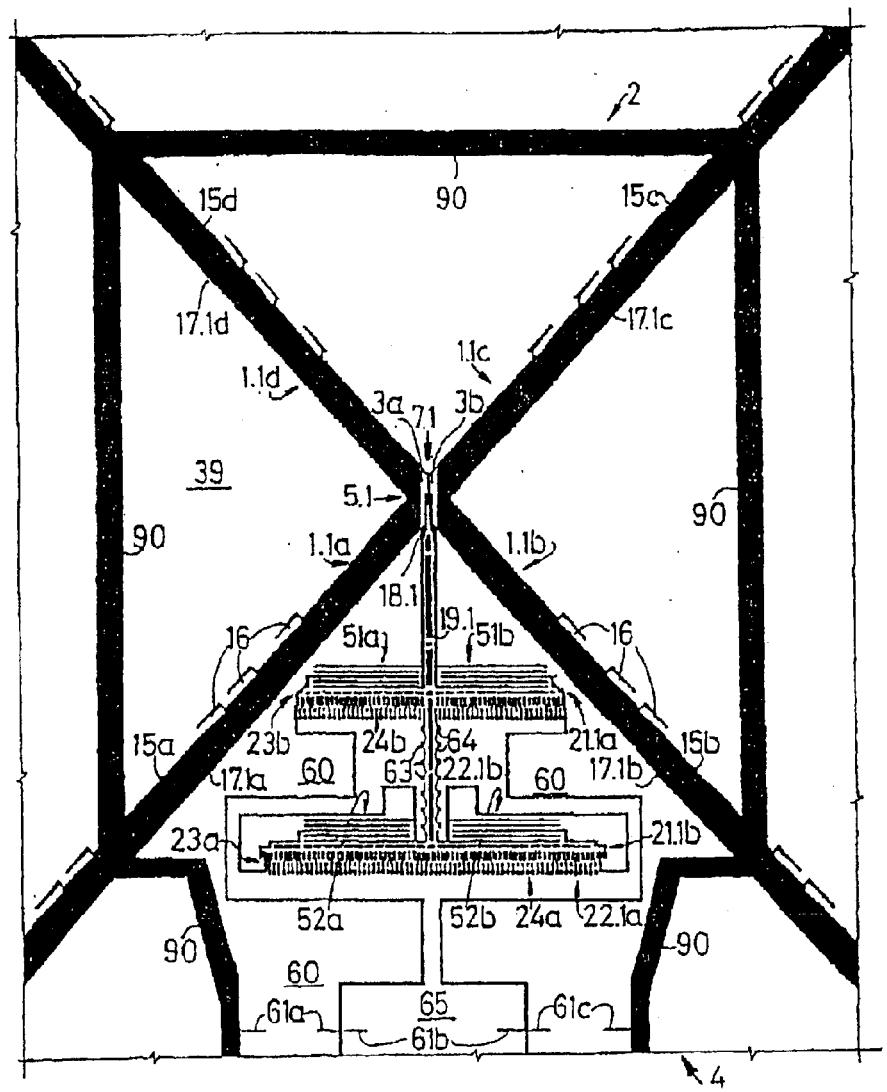
FIG. 1 shows a plan of a radiation guide switch in the radiation guide switching arrangement according to the invention.

The radiation guide switch 2, according to the invention, of a radiation guide switching arrangement 4 and as illustrated in FIG. 1 has been produced as a sandwich wafer from an SOI wafer 39 (silicon on insulator) by means of a production method as described in the following text. The radiation guide switch 2 has four radiation guide insert channels 1.1a to 1.1d, which are arranged at right angles to one another and into which, once the switch has been produced, radiation guides 49 can be inserted which are provided with points and taper toward the fiber end in accordance with the following description. All the radiation guide insert channels 1.1a to 1.1d lie in a single plane and run to a central space 5.1 in which a switching part 7.1, whose side surfaces are in this case mirrored, engages such that it can move. When the switching part 7.1 is inserted into the space 5.1, signals can then be transmitted between the radiation guides which are inserted into the insert channels 1.1a and 11.d, as well as 1.1b and 1.1c. When the switching part 7.1 is withdrawn, signals can be transmitted between the radiation guides which are inserted into the insert channels 1.1a and 1.1c, as well as 1.1b and 1.1d. FIG. 1 shows the switching part 7.1 in an intermediate position, with no voltage applied.

In addition to the side walls of the switching part 7.1, there are also two sacrificial webs 3a and 3b in this case, which are removed before operation of the radiation guide switching arrangement 4, as described in the following text. The radiation guides 49 are inserted into the radiation guide insert channels 1.1a to 1.1d such that the core, which carries the radiation, of each radiation guide in each case comes to rest immediately in front of the relevant side wall of the switching part 7.1 which in this case, by way of example, is mirrored.

The switching part 7.1 of the radiation guide switch 2 can be pushed into and out of the space 5.1 through a slot 18.1. Depressions produced by the etching are shown in black in FIG. 1. The switching part 7.1 is arranged on a filigree holder 19.1, which can be moved in its longitudinal axis direction in the slot 18.1. The components of the radiation guide switch 2 explained in the following text will be outlined only briefly here, and will be described in detail later, with reference to the radiation guide switch 20 illustrated in enlarged form in FIGS. 3a and 3b. In each case one supporting bar 21.1a and 21.1b, which extends on both sides and likewise has a filigree structure, is arranged on the holder end opposite the switching part 7.1, as well as approximately in its center, at right angles to the longitudinal axis of the holder 19.1. A comb structure 22.1a to 22.1b with first comb tines 23a and 23b, respectively, which point away from the space 5.1, is formed on each of the bar longitudinal faces. Second, fixed-position comb tines 24a and 24b, respectively, are arranged with a gap with respect to the first comb tines 23a and 23b, respectively. This comb tine arrangement is illustrated in enlarged form in FIG. 4c, and its electrostatic force effect is described in the following text. Mutually opposite comb tines 23a and 24a, as well as 23b and 24b, of the radiation guide switch 2 have different designs. The comb tines 23a and 23b, respectively, are in the form of straight small rods, and the opposite comb tines 24a and 24b are thickened in the tine end region. They taper conically toward the tine end, so as to produce an appearance of an arrowhead, and so that the row of comb tines produces the appearance of an avenue of trees. A U-shaped leaf spring 51a, 51b, 52a and 52b, which in each case has two leaf spring elements, is arranged on each of the supporting bars 21.a and 21b, on both sides of the holder 19.1.

The radiation guide 2 has two covering layer areas 60 and 65, which have bonding markings 61a to 61c and are used as an electrical connection for an electrical voltage that acts on the comb structure 22.1*a* and 22.1*b*. The comb tines 24*a* and 24*b* are connected to the covering layer area. The comb tines 23*b* in the comb structure 22.1*b* are connected to the covering layer area 60 via the leaf springs 51*a* and 51*b* as well as the supporting bar 21.1*a*. The electrical connection for the comb tines 23*a* of the comb structure 22.1*a* is provided by the supporting bar 21.1*a*, via the holder 19.1 and the supporting bar. The switching part 7, the holder 19, the supporting bars 21*a* and 21*b*, and the comb tine arrangement 23*a* and 23*b*, respectively, arranged on the latter are held in a floating manner on the covering layer 60 via in each case two spring elements 51*a* and 51*b*, as well as 52*a* and 52*b*, which are formed in pairs to the left and right of the holder.

Figure 2:
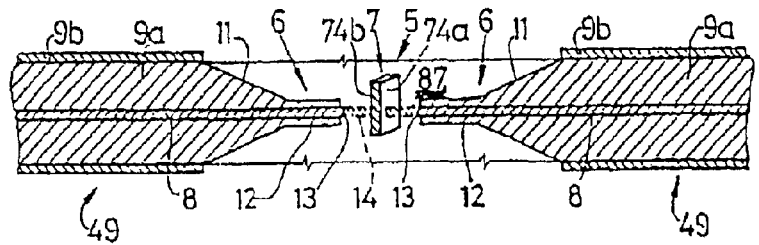
FIG. 2 shows a longitudinal section through mutually opposite radiation guide ends of the arrangement illustrated in FIG. 1, illustrated in enlarged form in order to explain radiation collimation between the guide ends.

A monomode guide is preferably used as the radiation guide 49, as illustrated in FIG. 2. The radiation guide 49 is composed of quartz glass, whose core 8 is doped differently to the cladding 9*a* and whose outer cladding 9*b* is a plastic protective sleeve. The radiation guides 49 are etched using a solution in which one part of 40 percent hydrofluoric acid is buffered with ten parts of 40 percent ammonium fluoride and 60% water. The profile obtained by the etching process is illustrated in FIG. 2. The core cladding 9*a*, which has a constant diameter of 125 μm, merges in a conical transition 11 into a core cladding end region 12, which has an approximately constant diameter of approximately 25 μm, is thin and tapers as a result of the etching process. The approximately 8 μm thick core 8 ends in a conical tip 13. As stated in the following text, the tips 13 interact with an index matching liquid 87, which surrounds the tips 13, as a collimator, which couples the radiation that emerges from the core 8 at the tip 13 as a parallel beam 14 into the core 8 of the respective opposite radiation guide 49. The radiation which is reflected on the tapered core cladding transition 11 is, however, reflected back at an angle which is too large for it still to be carried in the core 8 of the guide. This radiation is thus refracted by the cladding 9*a*, and is thus lost; back reflections are thus suppressed to a major extent, thus resulting in an excellent return loss.

The contour of the core cladding 9*a* shown in FIG. 2*a* with a two-stage taper is chosen in particular to allow the radiation guide ends 6 to be positioned as close to one another as possible in the space 5.1. Core cladding 9*a* with the original diameter would make this impossible. In order to produce the contour which is shown in FIG. 2, the plastic protective sleeve 9*b* is removed over a length of approximately 20 mm. The glass fiber is then broken by means of a fiber breaking tool at a distance from the end of the outer cladding that is intended to correspond to the thin diameter 12, thus producing a clean, broken surface. If etching is now carried out, then the plastic protective sleeve 9*b* which still remains forms an etching mask, and the etching liquid can reach only the projecting end of the glass fiber. However, during the etching process, the etching liquid penetrates along the transition between the glass fiber and the protective sleeve 9*a*/9*b*, thus achieving the desired conical transition 11.

The refractive index of the core 8 of the radiation guide 49 is 1.445. The index matching liquid should have a preferred refractive index of 1.43 to 1.44. Ethylcyclohexane, cyclododecane, butyrolacetone, cyclohexane, cyclohexyl acetate, tert-butylcyclohexane and decanonitrile may be used, by way of example, as liquids with a refractive index such as this. If the index matching liquid is heated, it is also possible to use, by way of example, limonene, myrcene and decalin with a refractive index of more than 1.45; heating reduces the refractive index. Octane, octene, silicone oils, decane and dodecane, which have a refractive index of less than 1.42, are less suitable but may still be used, by way of example.

A number of (in this case three) sprung lugs 16 are formed on each side wall 15*a* to 15*b* of the radiation guide insert channels 1.1*a* to 1.1*d* in FIG. 1. These lugs 16 now press the inserted radiation guides 49 against the other opposite channel wall 17.1*a*, 17.1*b*, 17.1*c* and 17.1*d*, respectively. The corresponding radiation guide 49 is in this way clamped firmly in the channel 1.1*a* to 1.1*d*. The insertion resistance, caused by these lugs 16, is low.

Between the two arrangements—spring elements, supporting bars, comb structure 51*a*, 51*b*, 21*a*, 22*a* and 52*a*, 52*b*, 21*b*, 22*b*—the slot 18 which accommodates the holder 19.1 has recesses 63 and, offset with respect to them, the holder 19 has studs 64. The recesses 63 and the studs 64 are arranged symmetrically with respect to the holder axis and with respect to the center line of the slot 18.1. The overall width, measured over two studs 64 which are arranged to the left and right of the holder shaft, is less than the width of the slot 18.1 only by a tolerance. The studs 64 and the recesses 63 are arranged with respect to one another, when the switching part 7.1 is in the rest position, such that the larger portion of the length of the studs 64 is located in the part of the gap 18.1 where there is no recess, and only a subregion of the studs, which corresponds to the longitudinal direction of the holder movement in the switching process, is located above the respective recess 63. If an electrical voltage is now applied between the covering layer area 60 and the covering layer area 65, then an electrostatic attraction force is produced, as described above, via the cam structure 22.1*a* and 22.1*b* as well as via the studs 64 and the "recess structure" on the holder 19.1.

Figure 3A:
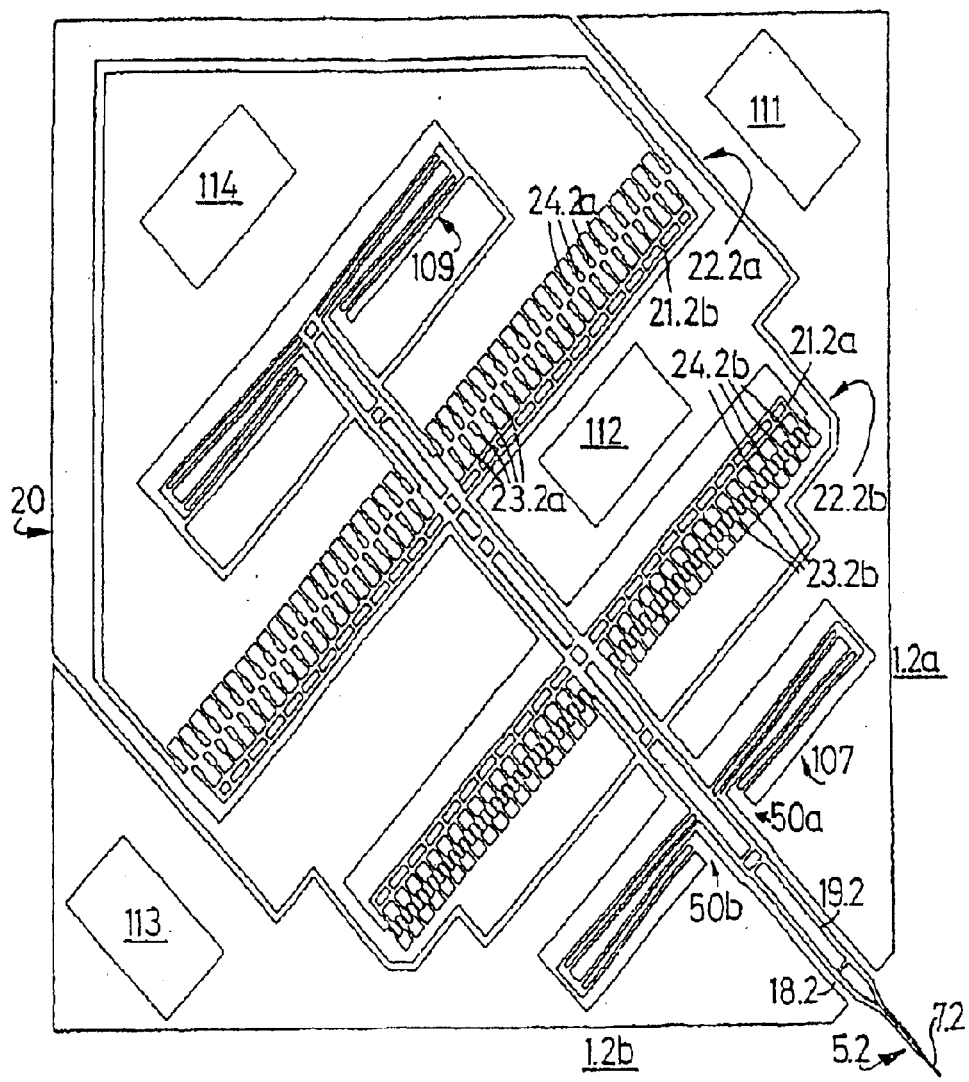
FIGS. 3a and 3b show a variant of the radiation guide switch as shown in FIG. 1, which can be used in a preferred manner in a matrix-like radiation guide switching arrangement as shown in FIGS. 9 to 11, with FIG. 3a showing a radiation guide switch with the switching part inserted, and FIG. 3b showing a radiation guide switch with the switching part withdrawn.
Figure 3B:
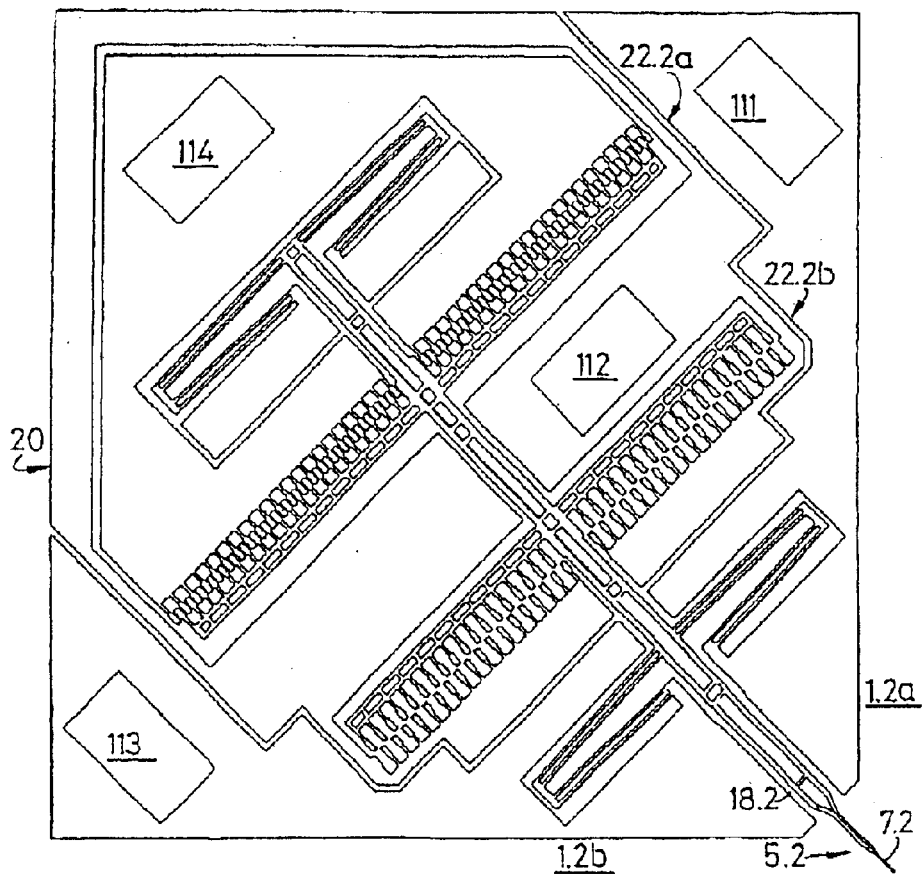

Details of the radiation guide switch 2 are described in FIGS. 3*a* and 3*b* with reference to a radiation guide switch 20. The radiation guide switch 20 is designed analogously to the radiation guide 2. However, it is designed such that it remains electrically on the one hand in an inserted "active" equilibrium position (in which signals are transmitted between radiation guides in the channels 1.2*b* and 1.2*a* which are analogous to the channels 1.1*a* to 1.1*d*) when a different voltage is applied and, in a further position, in a pushed-out "active" equilibrium position (in which signals are transmitted between radiation guides in the channels 1.2*a*/1.2*c* and 1.2*b*/1.2*d*). The radiation guide switch 20 is shown in a position with respect to the position of the radiation guide 2 and is used together with a further fifteen radiation guide switches in the switch chip 127 described in the following text. Analogous elements of the radiation guide switches 2 and 20 are annotated by the same reference symbols, but distinguished by "0.1" for the radiation guide 2 and with "0.2" for the radiation guide 20.

Figure 4A:
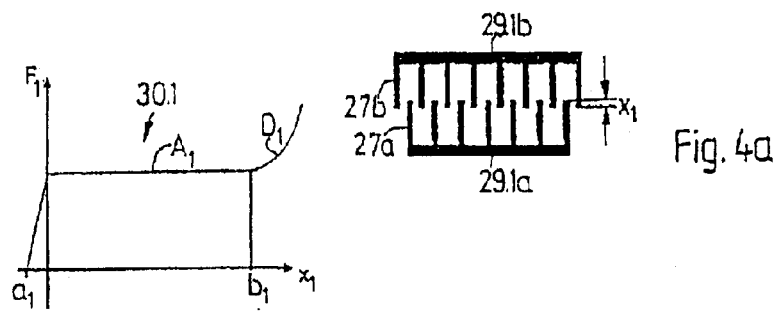
FIGS. 4a to e show a schematic illustration of a number of possible comb structures for a radiation guide switch and the profile of an electrostatic force F which can be produced by it, as a function of the comb tine end separation x in the structure, with FIG. 4a showing a comb structure as is known from WO98/12589 with identical thin comb tines, FIG. 4b showing a comb structure with a row of tines whose tines are identical to those in FIG. 4a, and the other row of tines has a cuboid cross section which is arranged on a narrow tine web, FIG. 4c showing a comb structure with a row of tines whose tines are identical to those in FIG. 4a, and the other tine row having tines which are analogous to the second row of tines in FIG. 4b, but with the free tine ends tapering (being arrow-shaped), FIG. 4d showing a comb structure with a row of tines whose tines are analogous to those in FIG. 4c; just with the "arrow-shaped" transition being replaced by a stepped transition, and FIG. 4e showing a comb structure with rows of tines analogous to those in FIG. 4b, but with the tines in one row additionally having a transverse web.
Figure 4B:
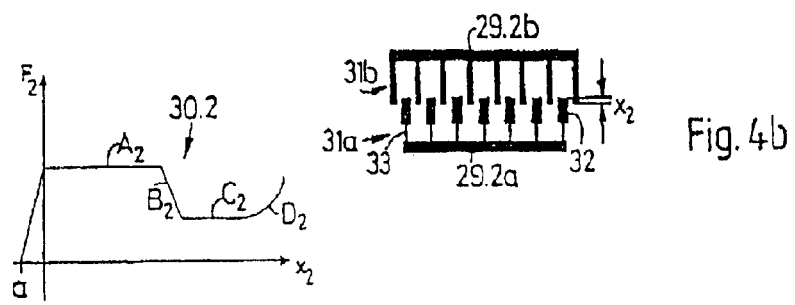

The switching part 7.2 of the radiation guide switch 20 can be pushed into and out of the space 5.2 through a slot 18.2. It is arranged on a filigree holder 19.2, which runs in the slot 18.2. One supporting bar 21.2*a* and 21.2*b*, which extends on both sides and likewise has a filigree structure, is arranged on each holder end, at the opposite end of the switch part 7.2, as well as approximately in its center, at right angles to the longitudinal axis of the holder 19.2. A comb structure 22.2*a* to 22.2*b* with first comb tines 23.2*a* pointing away from the space 5.2 and with a row of comb tines 24.2*b* pointing toward the space 5.2 is formed on each of the bar longitudinal faces. Second, fixed-position comb tines 24.2*a* and 23.2*b*, respectively, are arranged with a gap with respect to the first comb tines 23.2*a* and 24.2*b*, respectively. The comb tines 23.2*a*, 23.2*b*, 24.2*a* and 24.2*b* are identical, but mutually associated pairs are in mirror-image form with respect to one another, as is illustrated in FIG. 4d.

The electrostatic forces which act on the rows of comb tines when an electrical voltage is applied are described in the following text and in FIGS. 4a to 4e.

The spring element pairs 107 and 109 hold the holder 19.2 and thus the switching part 7.2. FIG. 3a shows the switching part 7.2 in a position in which it is pushed out into the space 5.2, and FIG. 3b shows it in a drawn back position. As already described above, when in the pushed-out position, radiation reflection occurs on the mirrored side surfaces 74a and 74b of the switching part 7.2.

Furthermore, the radiation guide switch 20 has four electrical contact surfaces 111 to 114. The contact surface 111 is electrically connected to the holder 19.2 in the area 50a via the one spring element of the spring element pair 107, and is thus connected to the tines 24.2b and 23.2a, respectively, which are arranged on the supporting bars 21.2a and 21.2b. It should be mentioned here that the tines 23a and 23b of the radiation guide switch 2 which are arranged on the supporting bars 21.1a and 21.1b point away from the space 5.1, while the tines 24.2b which are arranged on the supporting bar 21.2a of the radiation guide switch 20 point toward the space 5.2, and the tines 23.2a which are arranged on the supporting bar 21.2b point away from it.

The contact surface 113 is connected to the holder 19.2, and thus to the tines 23.2a and 24.2b, in the area 50b via the other spring element of the spring element pair 109. The two contact surface 111 and 113 are connected to one another via the holder 19.2.

The contact surface 112 is electrically connected to the fixed-position tines 23.2b. The free ends of these tines 23.2b point away from the space 5.2. The contact surface 114 is electrically connected to the fixed-position tines 24.2a. The free ends of this row of tines 24.2a point toward the switching part 5.2.

When no voltage is applied, adjacent tines 23.2b/24.2b as well as 21.2b/24.2a each half overlap a respective comb structure 22.2a and 22.2b. The switching part 7.2 is located in a switching intermediate position. When appropriate voltages are applied, the radiation guide switch 20 can be moved on the one hand to the position shown in FIG. 3a, and on the other hand to the position shown in FIG. 3b. If the voltage +$V_0$ is applied to the contact surface 114, -$V_0$ is applied to the contact surface 112, and a ground voltage (0V) is applied to the contact surfaces 111 and 113, then the switching part 7.2 has a stable position not only in the position shown in FIG. 3a but also in the position shown in FIG. 3b.

In order to switch from the position of the switching part 7.2 illustrated in FIG. 3a to that illustrated in FIG. 3b, the electrical voltage on the contact surface 114 is increased by $\Delta V$ to +$V_0$+$\Delta V$. At the same time, the electrical voltage on the contact surface 112 is increased by $\Delta V$ to -$V_0$+$\Delta V$ and, in addition, the voltage -$\Delta V$ is applied to the contact surfaces 111 and 113, resulting in switching to the position shown in FIG. 3b. Switching in the opposite direction takes place when the voltage states mentioned initially are assumed once again.

In order to ensure that signals are transmitted with losses that are as low as possible between the radiation guide ends, the core ends of the radiation guides 49 are designed appropriately in accordance with the above embodiment, and the space 5.1 (and 5.2) is filled with an index matching liquid. However, this liquid also propagates, coming from the central space 5.1, to the comb structures 22.1a and 22.1b.

Figure 4C:
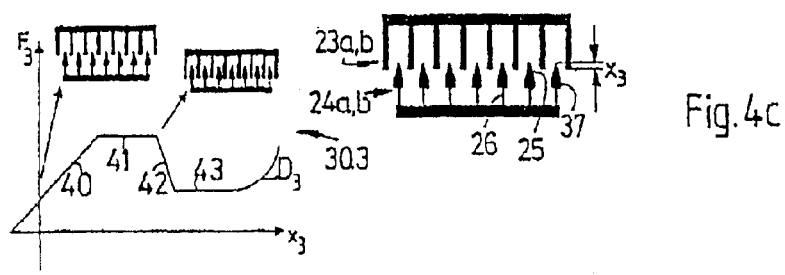
Figure 4D:
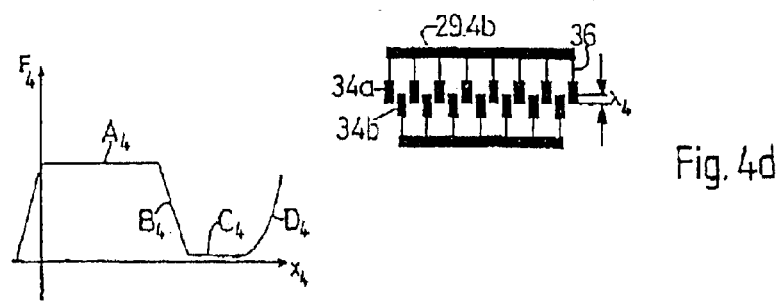
Figure 4E:
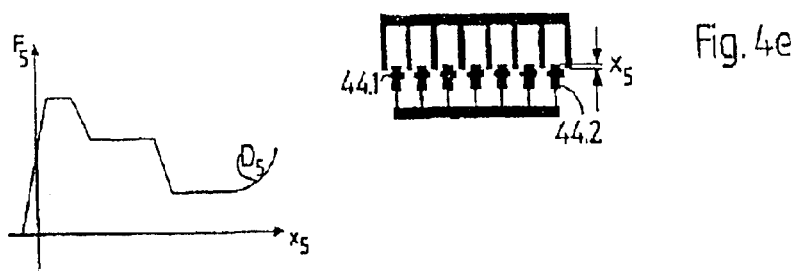

In order to achieve short switching times despite the presence of the liquid in the comb structures 22.1a and 22.1b, their comb tines are designed as illustrated in enlarged form in FIG. 4c. The comb tines 24.1a and 24.1b, respectively, have a conically thickening part 25, which is arranged on a thin web 26 as a tine foot. This refinement allows the index matching liquid to be forced easily out of the narrow gap when the two comb tine arrangements with the tines 23.1a and 24.1a as well as 23.1b and 24.1b, respectively, are moved with respect to one another. The friction resistance in the index matching liquid is reduced, which leads to a shorter switching time.

The comb tine shape chosen here also has another advantage, however. The movement distance of the two comb tine arrangements is self-limiting; there is therefore no need for a stop, as is absolutely essential in WO98/12589 (indicated there by the reference symbols 36 and 38). This also eliminates a source of faults, such as that which occurs in particular as a consequence of adhesion on the stops in the switch in WO98/12589.

This is because the electrostatic force that is produced is inversely proportional to the gap between the comb tines of the two comb tine arrangements. Specifically, the gap becomes larger here after the maximum movement of the comb tine arrangement, so that the force increase is sharply reduced. Minor fluctuations in the switching voltage thus now have scarcely any influence on the movement distance.

In order to illustrate this statement, FIGS. 4a, 4b, 4c, 4d and 4e show the electrostatic forces between difference comb tine arrangements. Each figure shows the comb tine arrangement on the right-hand side and the force F between the two tine arrangements on the left-hand side, with a constant DC voltage and with the separation between the tine ends being x. If the distance is x=0, the free tine ends of the one comb tine arrangement are in a line with those of the other comb tine arrangement. The further the tines engage in one another, the greater x becomes. x is a measure of the distance by which the tines engage in one another.

FIG. 4a shows a normal comb tine arrangement, with the fixed-position tines (webs 27a) being identical to the moving tines (bars 27b), that are used, by way of example, in WO98/12589. The force $F_1$ acting on the tine arrangement 27a/b is shown in the force/movement diagram 30.1 on the left. The force $F_1$ which acts on the arrangement is initially zero, when the tine ends are at a certain distance $a_1$ from one another. Starting with the tine ends being aligned with one another but with a gap [$x_1$=0], the force $F_1$ which acts on the comb structure with the tines 27a and 27b is constant over a wide range $A_1$ of the insertion of the tines 27a and 27b into one another. However, it rises sharply [region $D_1$] when the free tine ends approach the respective opposite connecting bars 29a and 29b, respectively, for the tine feet. An arrangement such as this should be operated with a mechanical stop, as is actually also the case in WO98/12589.

FIG. 4b show a tine arrangement in which the moving tines 31b are designed analogously to those shown in FIG. 4a. The fixed-position tines 31a have a broadened web region 32 with a cuboid cross section in their free tine end region, however. The force $F_2$ which acts on the tine arrange 31a/b is illustrated in the force/movement diagram 30.2 on the left. The force $F_2$ which acts on the arrangement is likewise zero when the tine ends are at a certain distance $a_2$ from one another. Until the broadened web regions 32 are located completely between the tines 31b, the force $F_2$ is constant [region $A_2$]. If the tines 31a/b are then moved further into one another, the narrow web part 33 which now comes into play results in the reduction in the force $F_2$ [region $B_2$]. This decreasing region B2 is then followed by a constant force region $C_2$, which merges into a rapid force increase (region $D_2$) when, in this case as well, the tine ends approach the opposite tine foot connecting web 29.1a or 29.2b, respectively. This tine arrangement does not require a mechanical stop; however, the displacement of the index matching liquid out of the tine intermediate spaces, as in the preferred embodiment which will be described in more detail in the following text, is not optimal.

FIG. 4c shows a tine arrangement according to that which has already been indicated in FIG. 1. The tines 23a and 23b, respectively, of the moving tine arrangement are in this case identical to those in FIGS. 4a and 4b. The fixed-position tines 24a and 24b, respectively, are designed analogously to the tines 31a; in the free tine end region, the part 32 is designed such that it tapers to a tip 25. The remaining region 37 still has a cuboid cross section. Since the gap between the bars 23a and 23b, respectively, which have equal widths, and the web part 25 decreases as they move toward one another, the electrostatic attraction force $F_3$ rises, as shown by the curve region 40. When the tapering regions 25 are pushed in between the tines 23a and 23b, respectively, the force $F_3$ is constant (curve region 41), since there is now no change in the gap width. The force decreases (curve region 42) only when the thin "web spike" 26 enters the region in which the free tine ends of the tines 23a and 23b are scattered. If the thin web spike 26 has no "edge disturbance" in the intermediate region of the tines 23a and 23b, respectively, the electrostatic force $F_3$ is constant once again (curve region 43). This tine arrangement does not require any mechanical stop either, but has the advantage of shorter switching tines than the tine arrangement shown in FIG. 4b.

Further refinement options for a tine arrangement are illustrated in the form of an associated electrostatic force/movement diagram in FIG. 4d. This tine arrangement has the same radiation guide switch 20 as that shown in FIGS. 3a and 3b. In contrast to the tine arrangements in FIGS. 4b and 4c, the mutually opposite tine arrangements in this case are identical, with in each case one tine part 34a and 34b, which has a cuboid cross section on a thin tine foot 36. The force/movement diagram associated with this tine arrangement has an analogous profile, with a few exceptions, to the force/movement diagram in FIG. 4c. However, a difference results that a constant force region A4, as shown in FIGS. 4a and 4b, starts once again when the tine ends, which are located opposite one another in the gap of the other ones, are at the same level. However, in comparison to the force/movement diagrams shown in FIGS. 4b and 4c, there is a deeper notch in a second constant force region $C_4$ once the tine parts 34a and 34b have moved passed one another, virtually to a force $F_4 \rightarrow 0$.

FIG. 4f shows a further variant of a tine arrangement. This tine arrangement is designed analogously to the tines illustrated in FIG. 4b, with the difference that there is a transverse web 44.1 in the tines 44.2 which have a cuboid cross section. This transverse web 44.1 results in a high pull-in force in comparison to the other tine arrangements in FIGS. 4a to 4d, and this is extremely useful for the acceleration of the holder which is shown in FIGS. 1, 3a, 3b and 9.

Figure 5:
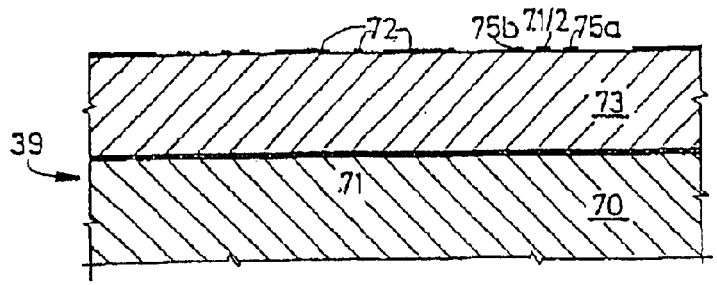
FIG. 5 shows a cross section through a masked SOI wafer for producing the radiation guide switch according to the invention.

The production of the radiation guide switch 2 or 20, respectively, as described above is based on an SOI wafer 39 as illustrated in FIG. 5. The SOI wafer 39 comprises a monocrystalline silicon substrate 70 on which an amorphous silicon dioxide intermediate layer $SiO_2$ 71 is applied. A silicon covering layer 73 is arranged on top of the silicon dioxide layer 71. This silicon covering layer 73 is masked by means of a mask 72 corresponding to the structure shown in the form of a plan view in FIGS. 1 and 3a/b, but additionally with an exception as described in the following text. The thickness of the covering layer 73 is chosen appropriately for the radiation guide 49 which is to be inserted into the radiation guide insert channels 1.1a to 1.1d and 1.2a to 1.2b. By way of example, it is 75 μm when using monomode radiation guides. The substrate 70 and the covering layer 73 are electrically conductive, while the intermediate layer 71 is electrically insulating.

The exception mentioned above in masking relates to the process of etching out the switching part 7.1 or 7.2, if this is intended to be used as a mirror for the radiation of adjacent radiation guides. The switching states of the radiation guide switch 2 or 20 comprise radiation being passed through between mutually opposite radiation guide ends in a first switching state, and radiation being passed by reflection via in each case one mirrored wall of the switching part 7.1 or 7.2 in the second switching state. In order to allow these two switching states to be produced, the radiation guide ends must lie in a plane,
the mutually opposite radiation guide end regions must be aligned with one another, and
the axes of the radiation guide ends, which are connected to one another for signal purposes in the second switching state, must meet the mirrored surface of the switching part at a single point and must have the conjugate angle to the normal at this point.

These conditions must be satisfied with a tolerance that is as small as possible in order to achieve a circuit with minimum radiation losses. The above conditions furthermore mean that the optical axes of the end regions of the radiation guide must intersect at that point, and each mirrored surface must be arranged on one of the angle bisectors of the optical axis. Furthermore, each mirrored surface must be at right angles to the plane in which the radiation guide ends are arranged. It has now been shown that, if the etching process as described in WO98/12589 were used, the mirrored surfaces of the switching part would not be at right angles, and that mutual separation would decrease in the downward direction. The reduction was a result of there being a relatively large space that was filled with etching ions during the etching process in the side wall region of the switching part.

In order to produce the radiation guide switch 2 or 20, the unmasked parts of the covering layer 73 are now removed in a vacuum chamber using a deep anisotropic reactive ion etching process. This process is carried out at a pressure of 2.6 Pa, at a temperature of −95° C. and with a voltage of −70 V (DC bias) between the electrode and the SIO wafer. In addition, a radio frequency of 13.5 MHz, a gas flow of sulfahexafluoride at 200 $cm^3$/min, of oxygen at 16 $cm^3$/min and of CHF at 10 $cm^3$/min are used. An inductively coupled plasma is used as the ion source.

Figure 6:
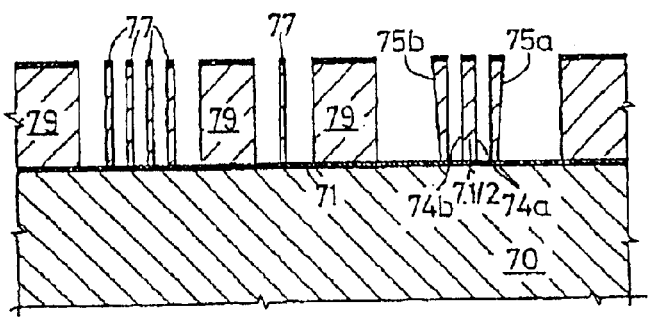
FIG. 6 shows a cross section analogous to FIG. 5, but after carrying out a deep anisotropic reactive ion etching process step.

This material removal process is continued until the unmasked covering layer material has been removed as far as but not including the intermediate layer 71, as is illustrated in the form of a cross section in FIG. 6.

In order to produce side walls 74a and 74b which are at right angles, a sacrificial web 75a and 75b is now arranged a short distance in front of each switching part side wall 74a and 74b. The sacrificial webs 75a and 75b can be seen in FIGS. 1, 5 and 6. Once the switching part 7.1 has been produced, with side walls 74a and 74b which are now exactly vertical, the sacrificial webs 75a and 75b are removed. These can be removed, using the method described in the following text, by using hydrofluoric acid to etch underneath the intermediate layer 71, as a result of which they are no longer held and fall out, and by etching directly underneath in the plasma etching system which is mentioned in the following text, by varying the etching parameters so as to achieve etching along the intermediate layer 71. A third possible way to remove the sacrificial webs 75a and 75b is to design them to be so thin that they can be converted to silicon oxide during the subsequent oxidation step (in order to reduce the roughness), and can then also be dissolved in the hydrofluoric acid while partially etching underneath the intermediate layer 71.

Figure 7:
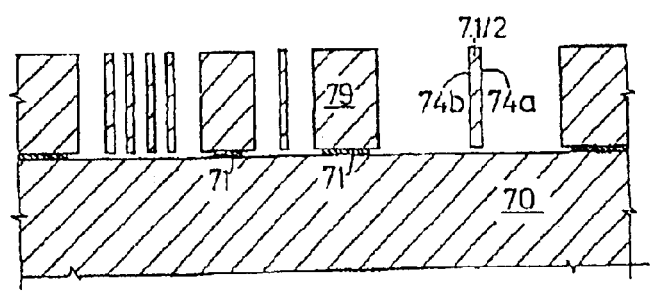
FIG. 7 shows a cross section analogous to FIGS. 5 and 6, but after carrying out a further etching step in order to produce the radiation guide switch according to the invention, with the sacrificial webs also being removed in this step, in order to ensure verticality of the switching part surfaces.

In a next method step, the intermediate layer areas 71 are now etched underneath the thin webs 77 shown in FIG. 6, until the latter are floating freely, using 48 percent hydrofluoric acid at room temperature. The intermediate layer areas 71 underneath the broad webs 79 are only etched in the form of grooves. However, the broad webs 79 remain, as is shown in FIG. 7.

The thin webs 77 then become the filigree parts as illustrated in FIGS. 1 and 3a/b. Since the switching part (mirror) 7.1 or 7.2, respectively, the holder 19.1 or 19.2, respectively, the supporting bars 21.1a and 21.1b as well as 21.2a and 21.2b, respectively, the sprung lugs 16 and the spring elements 51a/b and 52a/b as well as 107 and 109, respectively, together with their webs 57 are merely formed as a filigree structure from elements with thin widths, while these are necessary in accordance with mechanical requirements, they are "etched free". An analogous situation applies to the comb structures.

Once the entire structure has been produced, the side walls 74a and 74b of the respective switching part 7.1 or 7.2 may have an optical reflection coating vapor-deposited on them.

The four radiation guides 49 are then pushed into the corresponding radiation guide insert channels 1.1a to 1.1d and 1.2a to 1.2d. The insertion process is carried out under a microscope.

Once the radiation guides have been pushed into the appropriate radiation guide insert channels, the latter are adhesively bonded to a covering panel in the edge region of the switch arrangement. In order to ensure that the adhesive can never penetrate as far as the filigree parts, even in the event of careless handling, the radiation guide insert channels 1a to 1d are connected to adhesive holding channels 90, which can hold excess adhesive.

Instead of having to design the switching parts 7, 7.1, 7.2 and 101 such that radiation is completely blocked or is completely transmitted between two respective guide ends, only partial blocking can also be provided. An element such as this is then used for defined attenuation of signal radiation. In order to achieve this aim, it would now be possible to think of inserting a mirror only partially into a space 150 carrying radiation between two respective guide ends 151a and 151b. However, it has been found that, although this would allow attenuation, such attenuation would, however, be highly dependent on the polarization. This means that the attenuation of the TE (transelectrical) and TM (transmagnetic) waves would differ. In order to reduce the polarization dependency, the switching part 152 is in this case (FIGS. 12 and 13) provided with an attenuating metallic coating. The reflection and attenuation characteristics of such a coating can be calculated, by way of example, in accordance with Born and Wolf, "Principles of Optics", "An absorbing film on a transparent substrate", page 628 et seqq, Pergamon Press, 1975.

The polarization dependency between the two wave types—TE and TM waves—is due to the fact that, in the case of a diffraction arrangement, the boundary conditions on the metallized free edge of the switching part 152 may be different. The polarization dependency can now be reduced if the switching part 152 is no longer arranged only slightly away from the vertical with respect to the aligned axis 153 of the two guide ends 151a and 151b, but an angle of less than 65°. Very good results have been achieved with an inclination of less than 50°, and preferably at 45°.

An angle which deviates only slightly from the vertical was previously chosen in order that no radiation could be reflected back into one of the guide ends 151a or 151b. Otherwise, it would be desirable to achieve an arrangement that was as vertical as possible. The severe inclination (small angle) proposed here was contrary to the prior art.

The gap 154 between the guide ends 151a and 151b must be enlarged as a result of the angle, which has been reduced in comparison to the prior art, between the surface of the switching part 152 and the axis 153, which could lead to increased radiation losses between the two ends 151a and 151b. These losses are illustrated in FIGS. 12 and 13 by an opening beam profile 150, which is no longer received entirely by the guide core 155. However, this distance increase can be kept within limits by bending the attenuating part 157 at a bend point 156 in the switching part 152.

Depending on the predetermined basic attenuation, the gap 154 may in this case be filled with an index matching liquid, or else this liquid may be dispensed with. A predetermined attenuation between a high value and a low value can now be set by means of two fixed end positions of the attenuating part 157 within or outside the space 150 which carries the radiation. However, intermediate positions may also be assumed.

Figure 8:
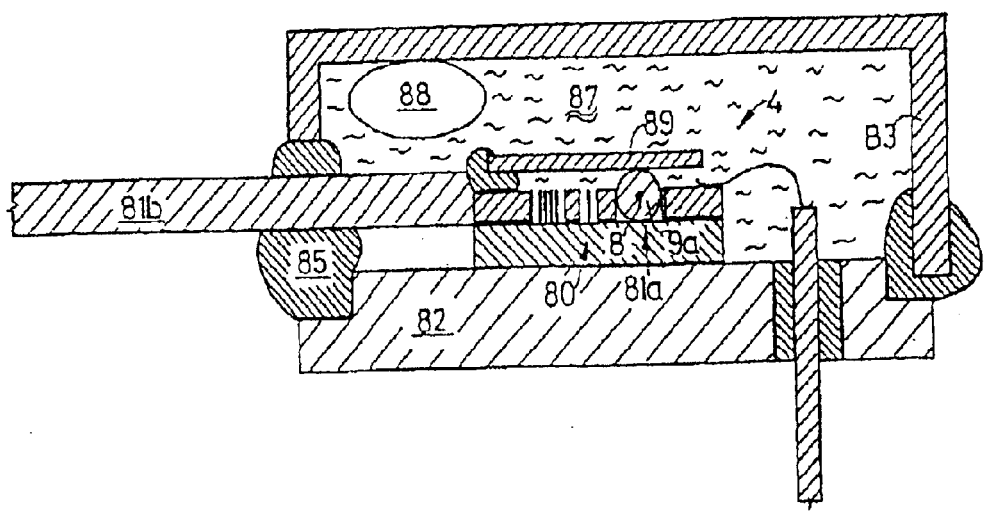
FIG. 8 shows a cross section through a radiation guide switching arrangement which is encapsulated such that it is fluid-tight.

FIG. 8 shows, in simplified form, a radiation guide switching arrangement 4 having only a single radiation guide switch 80, which may be designed analogously to the radiation guide switch 2 or 20. Furthermore, only two radiation guides 81a and 81b are shown, for the sake of simplicity. The arrangement 4 is arranged on a base 82 and is covered by a cover 83, which is connected to the base 82 in a fluid-tight manner. The cover 83 has fluid-tight bushings 85 for the radiation guides 81a and 81b. The interior 86 of the radiation guide switching arrangement 4 is filled with an index matching liquid 87 in accordance with what has been stated above, in order to achieve a collimated beam. Furthermore, there is a gas bubbles 88 in the interior 86, whose volume is predetermined such that any pressure in the housing interior 86 resulting from thermal expansion of the index matching liquid 87 and of the housing walls 82 and 83 is not greater than or less than a predetermined value.

Figure 10:
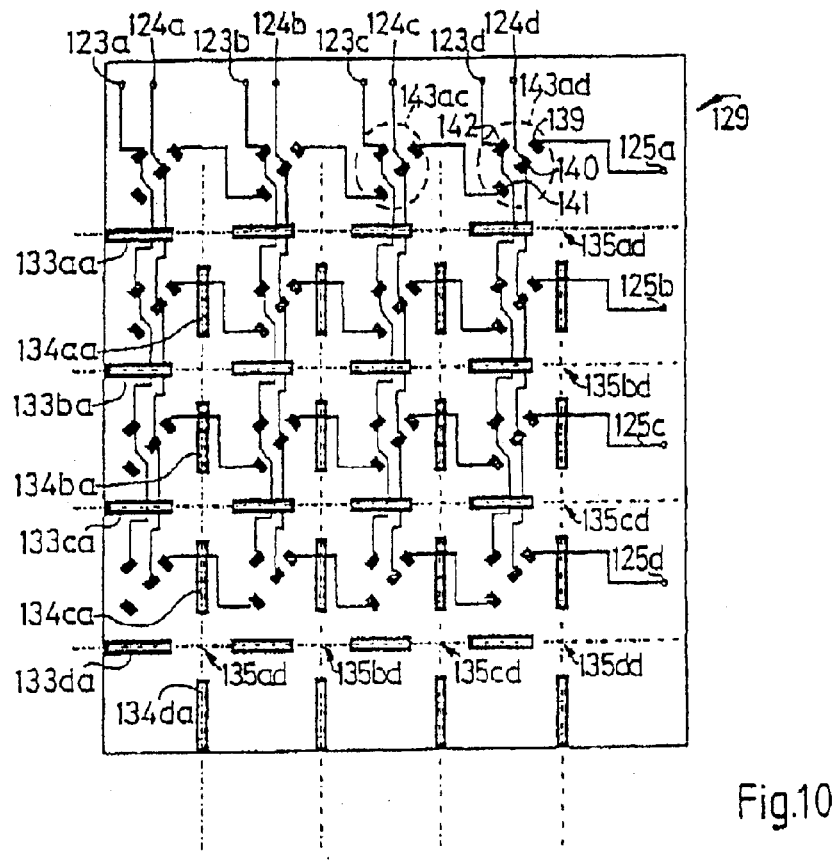
FIG. 10 shows a plan view of a conductor chip which can be connected by means of flip chip bonding to the switch chip illustrated in FIG. 9.
Figure 9:
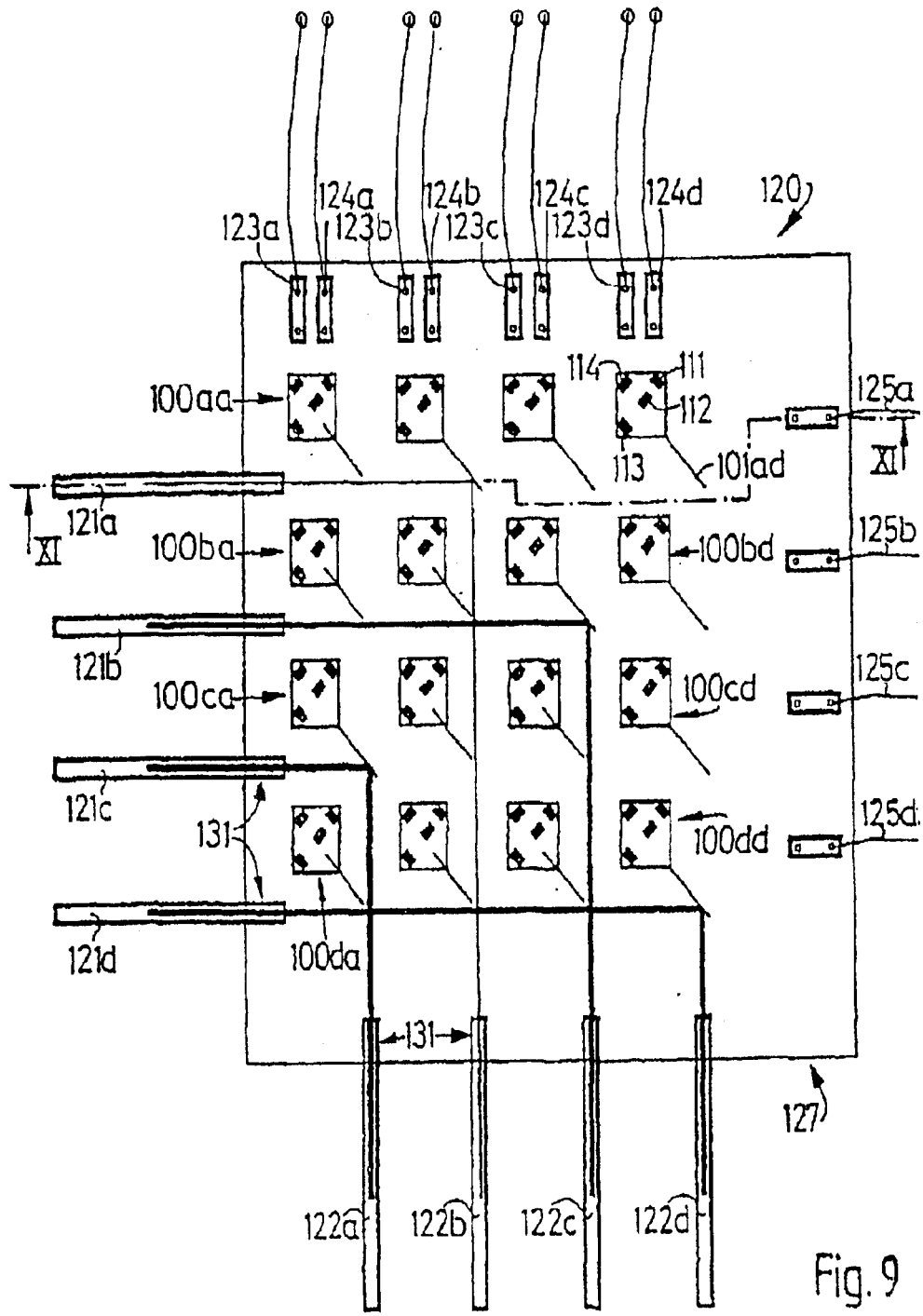
FIG. 9 shows a plan view of a switch chip having sixteen radiation guide switches arranged like a matrix.

Instead of only a single radiation guide switch 2 or 100, a number of radiation guide switches may also be used in one radiation guide switching arrangement. Once such matrix-like arrangement 120 for m "incoming" and n "outgoing" radiation guides 121a to 121d and 122a to 122d has m·n, in this case sixteen, radiation guide switches 100aa to 100dd. The sixteen radiation guide switches 100aa to 100dd make it possible to switch the signal flow between the radiation guides 121a to 121d and 122a to 122d. An arrangement 120 such as this is illustrated in FIGS. 9 and 10, with the switching parts 101aa–101dd likewise being mirrored in this case. 2m+n or m+2n, in this case twelve, electrical drive connections 123a to 123d, 124a to 124d and 125a to 125d are provided for driving the radiation guide switches 100aa to 100dd, which are arranged like a matrix.

In the radiation guide circuit arrangement 120, the radiation guide switches 100aa to 100dd, which are arranged like a matrix, are connected to one another in order to drive them electrically, and the optical connections are connected to one another in a switch chip 127 (see FIG. 9), by means of a conductor chip 129 (see FIG. 10) which is applied using flip chip technology.

Sixteen radiation guide switches 100 are applied to the switch chip 127, in an analogous manner to those illustrated in FIGS. 3a and 3b. In order to avoid overloading in FIG. 9, only the contact surfaces 111 to 114 of the individual radiation guide switches 100a a to 100dd, as well as the holder 103 with the mirrored switching part 101, are illustrated. Furthermore, the switch chip 127 has in each case four aligning channels 131 for introduction of the "incoming" and "outgoing" radiation guides 121a to 121d and 122a to 122d. In order to provide the electrical drive for the radiation guide switches 100aa to 100dd, the switch chip 127 has, on a face which is free of aligning channels, four bonding pad pairs 123a/124a to 123d/124d and, on the side which is free of other aligning channels, four bonding pads 125a to 125d. Wires are bonded to these pads, and lead to the houding.

Figure 11:
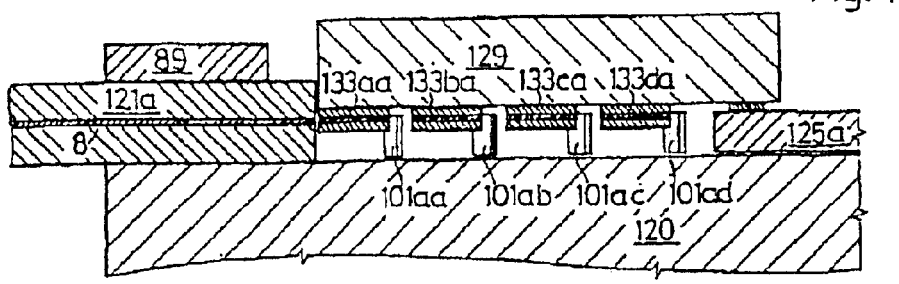
FIG. 11 shows a cross section through the matrix-like radiation guide switching arrangement, produced using flip chip technology, along the lines XI—Xl in FIG. 9.

The conductor chip 129 illustrated in 10 has a number of integrated waveguide subelements 133aa to 133dd and 134aa to 134dd, which are aligned with one another, are arranged in a plane and are each interrupted by free space sections 135aa to 135dd. Four waveguide subelements 133aa –133dd are in each case aligned with the aligning channels 131 for the radiation guides 121a to 121d. The respective four waveguide subelements 134aa to 134dd are aligned with the aligning channels of the radiation guides 122a to 122d. The free space sections 135aa to 135dd are each provided in the region of the switching parts 101aa to 101dd of the radiation guide switches 100aa to 100dd. Contact areas 143aa to 143dd with the contact surfaces 139 to 142 are provided on the conductor chip 129 matching the respective contact surfaces 111 to 114. These contact surfaces are in the form of contacts (solder bumps) which can be soldered, and can be soldered to the switch chip using flip chip technology. All the contact surfaces 140 and 142 of the contact areas 143(a–d)a, 143(a–d)b, 143(a–d)c and 143(a–d)d (vertical direction in FIG. 10) are connected to one another and to in each case one connection 124a–d or 123a–d. One contact surface 141 is in each case connected to one contact surface 139 of an adjacent contact area in a row. The contact surface 139 which is in each case adjacent to the right-hand side of the conductor chip in FIG. 10 is connected to a connection which is associated with the electrical connection 125a to 125d. The contact surfaces 139 and 142 in a respective contact area 139aa to 139dd are electrically connected to one another, via the respective spring element 109 by means of the contact surfaces 111 and 113, which are located on them, of the radiation guide switches 100aa to 100dd. FIG. 11 shows schematically and in the form of a cross section how, by way of example, the radiation guide 121a, the switch chip 127 and the conductor chip 129 are joined together. An electrical connection between the respective contact areas 111 and 113 of the switching parts 101aa to 101dd is made via the respective spring element pair 107 and the holder 19.2.

In order, by way of example, to introduce the second mirrored switching part 101a b in the first row in FIG. 10 into the central space 5 in the free space section 135a b between the waveguide subelements 133a b and 134a b, the voltage $+V_0$ is applied to the connection 124b, and the voltage $-V_0$ is applied to the connection 125a. There is now a voltage of $2V_0$ only on the radiation guide switch 100ab, and this is able to switch the bistable suspension. Only the voltage $V_0$ itself is present on the other radiation guide switches 100aa, 100ac and 100ad in the first row and those switches 100bb, 100cb and 100db in the second column, and this is not sufficient for them to switch. There is thus a "through connection" between the two radiation guides 121a and 122b. Furthermore, FIG. 9 also shows through connections for the guides 121b and 122c, for the guides 121c and 122a, as well as for the guides 121d and 122d.

Analogously to the matrix-like arrangement of a number of radiation guide switches as described above, a number of attenuating units 160a to 160d may also be arranged together. The attenuating units 160a to 160d can now also be combined linearly to form a so-called array. Attenuating units 160a to 160d may also be arranged together with radiation guide switches on a chip. The production process can likewise be carried out by means of photolithography and an etching technique. The distance between the individual attenuating units should, however, correspond to the standard distance between the radiation guide switches described above.

In the case of fiber ribbons, a number of radiation guides are joined together and are adhesively bonded with a separation of 250 $\mu$m. There is thus likewise a distance of 125 $\mu$m between the individual fibers, which have a standard separation of 125 $\mu$m. This distance is sufficient for an "electrostatic motor" for movement of the switching part 152. This "electrostatic motor" is designed analogously to that of the radiation guide switches, as is illustrated in FIGS. 1, 3a and 3b. In order to connect this "electrostatic motor" electrically, appropriate wire bonding must be implemented. To do this, a second printed circuit board is arranged underneath the silicon substrate (for example underneath the silicon substrate 70), with this silicon substrate having bonding surfaces. The arrangement is now chosen such that the bonding wires in this case run in the space between the radiation guides.

FIG. 14 illustrates an array-like arrangement of in this case, by way of example, four attenuating units 160a to 160d. One spring part 161a to 161d is in each case arranged separately from in each case one electrostatic drive 162a to 162d. This makes it possible to produce very narrow attenuating units, which are located between the channels 163a to 163e for the individual radiation guides.

Instead of only a single switching part 7, 7.1, 7.2, 101aa to 101dd and 152, it is also possible, as shown in FIG. 15, to arrange a number of switching parts 165a to 165d in a single radiation guide switch 166. In this case as well, the ends 170a to 170f of radiation guides 169a to 169f lie in a plane, in the form of beams. For the sake of simplicity, the switching parts 165a to 165d are in this case shown only with one small holder piece 166a to 166d ; the entire electrostatic movement device, which has already been described above, is not shown. The switching parts 165a to 165d are mirrored on their unshaded face, for the radiation which is to be coupled into the radiation guides 169a to 169f. The radiation guide switch 166 is now designed such that the radiation from the radiation guides 169a to 169c and 169e as well as 169f can now be introduced by means of in each case one of the switching parts 165a to 165d into the radiation guide 169d, provided that an appropriate switching part of the switching parts 165a to 165d, in this case by way of example the switching part 165a, has been pushed into the central space 171.

If, by way of example as illustrated in FIG. 15, the switching part 165a has been pushed in, then radiation which emerges from the radiation guide 169c is reflected on the mirrored surface of this switching part 169a, and is coupled into the core of the radiation guide 169d. Radiation emerging from the remaining radiation guides 169*a*, 169*b*, 169*e* and 169*f* cannot be coupled into the radiation guide 169*d*. In order to achieve sufficient decoupling of the output radiation from the other radiation guides, their radiation (if it can fall onto the reflective surface of one of the switching parts which have been pushed in) should fall at an angle of more than 12° to the core axis. In the example shown here, radiation from the radiation guide 169*b* also falls onto the mirrored surface of the switching part 165*a*. After reflection, the radiation from the guide 169*b* should then be incident at an angle of more than 12° to the core axis of the radiation guide 169*e* (and, of course, also to the core axis of the radiation guide 169*d*) and will then no longer be coupled into it.

In order to determine an optimum angle, reference is made to the publication by C. M. Miller, C. Mettler, A. White in Optical Fiber Splices and Connectors, Theory and Methods, New York; Marcel Dekker Inc., 1986, Chapter 4. This describes a method for calculating coupling losses between two mutually tilted and offset fibers. This theory is applied, in a modified form, to the fiber end arrangement shown in FIG. 15.

The position of the relevant switching part 165*a* to 165*d* is now chosen such that optimum coupling is achieved for the two "switched" radiation guide ends in the switched state, and a coupling loss of at least 50 dB is achieved for the other radiation guide ends.

An estimate of the coupling loss Γ in dB can be made using the formula quoted below, the explanation of which can be found in FIG. 16. FIG. 16 shows two cores 173 and 174, which carry radiation, are tilted through an angle θ with respect to one another and are offset by a value r with respect to one another, of guide ends separated by a distance z. The coupling losses Γ are in this case given by:

$$\Gamma = -10 \log\left[\frac{16 n_{co}^2 \cdot n_0^2}{(n_{co}+n_0)^4} \cdot \frac{1}{q} \exp\left\{\frac{p \cdot u}{q}\right\}\right]$$

In the above formula, $n_{co}$ and $n_0$ mean the refractive index of each radiation guiding core and, respectively, of the material in the space between the guide ends, that is to say generally our index matching liquid.

$q=G^2+1$, where $G=z/k \cdot w^2$

According to FIG. 16, z is the distance between the relevant guide ends. w is the radius of the free beam between the guide ends, in which the radiation power is dropped to 1/e part of the maximum.

$k=2\pi n_0/\lambda$, where λ is the wavelength of the radiation in the vacuum.

$p=k \cdot w2/2$ $u=F^2+2F \cdot G(\sin\theta)+(G^2+\frac{1}{2})\sin^2\theta$ where θ is the tilt angle between the two guide ends. Since, however, mirrors 165*a* and 165*d* are interposed in the arrangement shown in FIG. 15, θ is an angle value without a reflection value (correction by double addition of the reflection angle of the relevant mirror).

$F=r/k \cdot w^2$

If typical values are inserted in this formula, then this results in a coupling loss Γ of more than 55 dB in a wavelength band from 1250 nm to 1630 nm, and with a tilt angle of 12°. This means that the core axis of the radiation guide ends into which radiation is no longer intended to be coupled should preferably be at a tilt angle θ of at least 12°.

If the switching part 165*a* is drawn out and the switching part 165*b* is pushed in, then radiation is coupled from the radiation guide 169*b* to the radiation guide 169*d*. The switching part 165*d* provides coupling from the radiation guide 169*e* to the radiation guide 169*d*, and the switching part 165*c* provides coupling from the radiation guide 169*f* to the radiation guide 169*d*. If all the switching parts 165*a* to 165*d* are drawn out, radiation can be coupled from the radiation guide 169*a* to the radiation guide 169*d*.

Instead of the radiation being coupled from the radiation guides 169*a*, 169*b*, 169*c*, 169*e* and 169*f* into only one radiation guide 169*d* by means of the appropriate switching parts 165*a* to 165*d*, radiation from the radiation guide 169*d* can also be coupled, using precisely this arrangement, individually into the radiation guides 169*a*, 169*b*, 169*c*, 169*e* and 169*f*.

Two switching parts 165*a* and 165*b* as well as 165*c* and 165*d* are in each case arranged on both sides of the radiation guide 169*a*, aligned with the radiation guide 169*d*. The radiation guides 169*b* to 169*f* are arranged such that they are closely adjacent. The switching parts 165*a* to 165*d* could also be arranged individually between two respectively adjacent radiation guides, although the radiation would not necessarily be switched from and through these radiation guides. However, in comparison to the illustration that has just been sketched, the illustration shown in FIG. 15 occupies less space, so that more radiation guides can be switched per space unit. Other configurations are also possible in addition to the arrangement shown here and the number of radiation guides.

In the case of the arrangements just sketched, the central space 171 is also preferably filled with an index matching liquid, but need not be (poorer embodiment).

As stated above, the reflective surface of the switching part can now be arranged with respect to in each case two radiation guide ends such that the radiation can be coupled between these two radiation guides. However, further radiation guide ends may also be arranged such that, by way of example, two further radiation guide ends can still be coupled to one another by means of one and the same switching part.

What is claimed is:

1. A radiation guide switching arrangement (4, 120) having at least one radiation guide switch (2, 100, 100*aa*–100*dd*, 166), produced from a sandwich wafer (39) with a substrate (70), a covering layer (73), and an electrically insulating intermediate layer (71), with each radiation guide switch (2, 100, 100*aa*–100*dd*, 166) having at least one moveable switching part (7, 101, 101*aa*–100*dd*; 152; 165*a*–*d*) and at least two radiation guide ends (6, 133*aa*–133*dd*, 134*aa*–134*dd*; 170*a*–*f*) which come to rest in a plane and are arranged closely adjacent to one another such that radiation which emerges from one radiation guide end (6, 133*aa*–133*dd*, 134*aa*–134*dd*; 151*a*, 151*b*; 170*a*–*f*) can be blocked on its optical path to another guide end (6, 133*aa*–133*dd*, 134*aa*–134*dd*; 151*a*, 151*b*; 170*a*–*f*), or can be reflected into this other guide end, by means of the switching part (7.1, 7.2, 101, 101*aa*–101*dd*; 165*a*–*d*), characterized in that the intermediate space (5, 135*aa*–135*dd*; 154; 171) which holds the switching part (7, 101, 101*aa*–101*dd*; 152; 165*a*–*d*) between the guide ends (6, 133*aa*–133*dd*, 134*aa*–134*dd*; 151*a*, 151*b*; 170*a*–*f*) is filled with an index matching liquid which has a predetermined refractive index, and the radiation-carrying core (8) of each radiation guide (49; 169a–f) is designed to taper such that radiation collimation (14) can be achieved by interaction with the refractive index of the index matching liquid and the free core profile (13) in the space (5, 135aa–135dd: 154; 171) which is filled with liquid.

2. The arrangement (4, 120) as claimed in claim 1, characterized in that the refractive index of the index matching liquid is at most of equal magnitide to the refractive index of each radiation guiding core (8), and the refractive index of the liquid is preferably between 99.90% and 98.00% with respect to the core refractive index, but is preferably chosen to be between 99.4% and 98.6%.

3. The arrangement (4, 120) as claimed an claim 1 or 2 having at least one radiation guide switch (2, 100, 100aa–100dd; 166) which has a holder (19, 103; 166a–d) for holding the switching part (7, 101, 101aa–101dd; 165a–d) which can be moved between the radiation guide ends (6, 133aa–133dd, 134aa–134dd; 170a–f), each holder (19, 103; 166a–d) has at least one first combed structure (23a, 23b; 115, 116) which is connected to it, a second fixed-position comb structure (24a, 24b; 117, 119) which matches the first comb structure (23a, 23b) is provided, whose comb tines (24a, 24b) are arranged with a gap with respect to the first structure (35), and a first and a second electrical voltage can be applied to the two comb structures (23a, 23b, 24a, 24b; 115, 116, 117, 119) in order to produce an electrostatic movement force, characterized in that each tine of at least one of the comb structures (23a, 23b, 24a, 24b) has in its free tine end region a region with a broadened cross section, in order to hold the relevant comb structure with an electrostatic voltage applied to it, and hence the switching part (7.2,101, 101aa–101dd; 165a–d) in a stable position.

4. The arrangement as claimed in claim 3, characterized by at least one leaf spring element (51a, 51b, 52a, 52b; 107, 109) which is firmly connected to the holder (19; 103), and on which the first comb structure (23a, 23b) is preferably in each case arranged, and, in particular, each leaf spring element (51a, 51b, 52a, 52b) is designed such that it runs approximately at right angles to the movement direction of the holder (19).

5. The arrangement (4,120) as claimed in claim 1, characterized in that each switching part. (7, 101, 101aa–101dd; 165a–d) has at least one surface (74a,74b) which acts as a mirror for the radiation of the radiation guide.

6. The arrangement in particular as claimed in claim 1, characterized in that the switching part (152) can be inserted into a radiation-carrying space (150) in the intermediate space (154) between in each case two guide ends (151a, 151b) in such a manner that this results in a predetermined attenuation of the radiation, in particular the attenuating part (157) of the switching part (152) which can be inserted into the radiation-carrying space (154) being provided with a metal coating, and the angle between the attenuating part (157) and the flush axis (153) of the two guide ends (151a,151b) preferably being an angle of less than 65° and preferably of less than 50°, in order to reduce polarization-dependent attenuation caused by the inserted attenuated part.

7. The arrangement as claimed in claim 1, characterized by a number of switching parts (165a–d) in a radiation guide switch (166), in which case each switching part (165a–d) can be pushed in front of each ease two radiation guide ends (170c/170d; 170b/170d; 170e/170d; 170f/170d) of two radiation guides (169c/169d; 169b/169d; 169e/169d; 169f/169d) such that radiation coupling and/or attenuation are/is possible, and the switching parts (165a–d) are preferably associated with the radiation ends (170a–d) such that output radiation from a number of radiation guide ends (170a,170b, 170c,170e,170f) can in each case be coupled individually, depending on the switching position of one of the switching parts (156a–d), into a single radiation guide end (179d) and/or, in particular, the output radiation from a single radiation guide end can in each case be coupled individually, depending on the switching position of one of the switching parts, into one of the radiation guide ends.

8. The arrangement (4,120) as claimed in claim 1, characterized by a fluid-tight housing with fluid-tight bushings for the radiation guides and the electrical cables, with the housing interior (86) being filled with the index matching liquid except for a gas bubble (88), and the volume of the gas bubble (88) being predetermined such that any pressure in the housing interior (86) as a result of thermal effects is not greater than or less than a predetermined value.

9. The arrangement (120) as claimed in claim 1, characterized by a number of switches (100aa–100dd) which are arranged like a matrix in one place, preferably on a first chip, with this chip having n particular integrated electrical guide subelements for electrical voltages which can be applied to the switches (100aa–100dd), and for the optical, and preferably the electrical connections, a second chip, which is in the form of a waveconductor chip and is preferably applied using flip chip technology, is provided between the switches.

10. A method for producing the radiation guide switching arrangement (4,120) haviny at least one radiation guide switch (2,100,100aa–100dd; 165a–d), in which case the switch part (7.1,7.2,101,101aa–101dd; 165a–d) can be moved in front of at least two radiation guide ends (6,133aa–133dd, 134aa–134dd; 170a–f) which lie in a plane, as claimed in claim 1, produced from a sandwich wafer (39) which has a substrate (70), a covering layer (73) and en electrically insulating intermediate layer (71), characterized in that the radiation guide switching arrangement (4;120) is produced from the sandwich wafer (70), inter alia with the switching part (7,101,101aa–101dd; 165a–d) and the guide channels (1.1aa–1.1dd; 1.2–1.2d, 131) for the radiation guides (49; 121a–121d, 122a–122d; 169a–f) and their ends (6, 133aa–l33dd, 134aa–134dd; 170a–f) by means of an etching process, during which at least one sacrificial web (75a,7b) is in each case produced in the immediate vicinity of each of the outer faces *74a,74b), which run at right angles to the plane, of the switching part (7,101,101aa–101dd; 165a–d), in order to avoid the outer faces (74a,74b) having a profile which differs from the normal to the plane.

11. The method as claimed in claim 10, characterized in that the sandwich wafer (39) has a covering layer (73) which is composed essentially of silicon and whose unmasked areas are removed in an ion etching process, with each sacrificial web (75a, 75b) being at a distance of approximately 10 $\mu$m, with a distance tolerance of −5 $\mu$m to +20 $\mu$m, for a covering layer thickness of approximately 73 $\mu$m with a thickness tolerance of +/−3 $\mu$m.

* * * * *